Feb. 21, 1933.  M. FOX  1,898,578
RECESS BED
Filed March 22, 1929  2 Sheets-Sheet 1
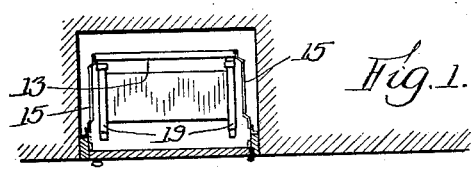
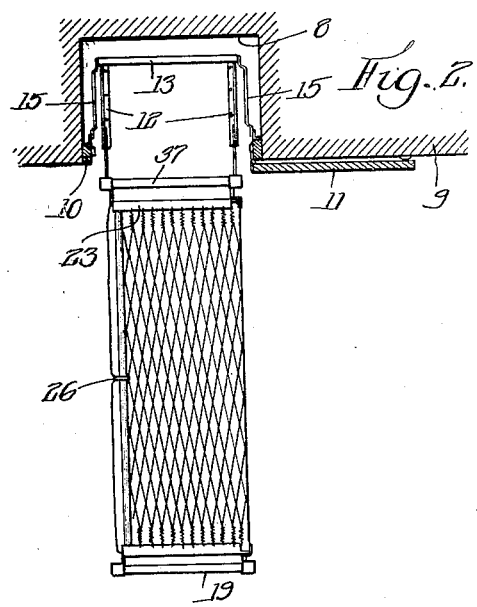
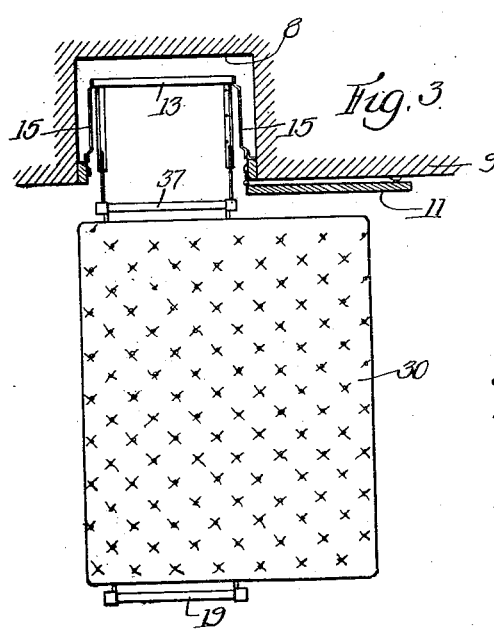
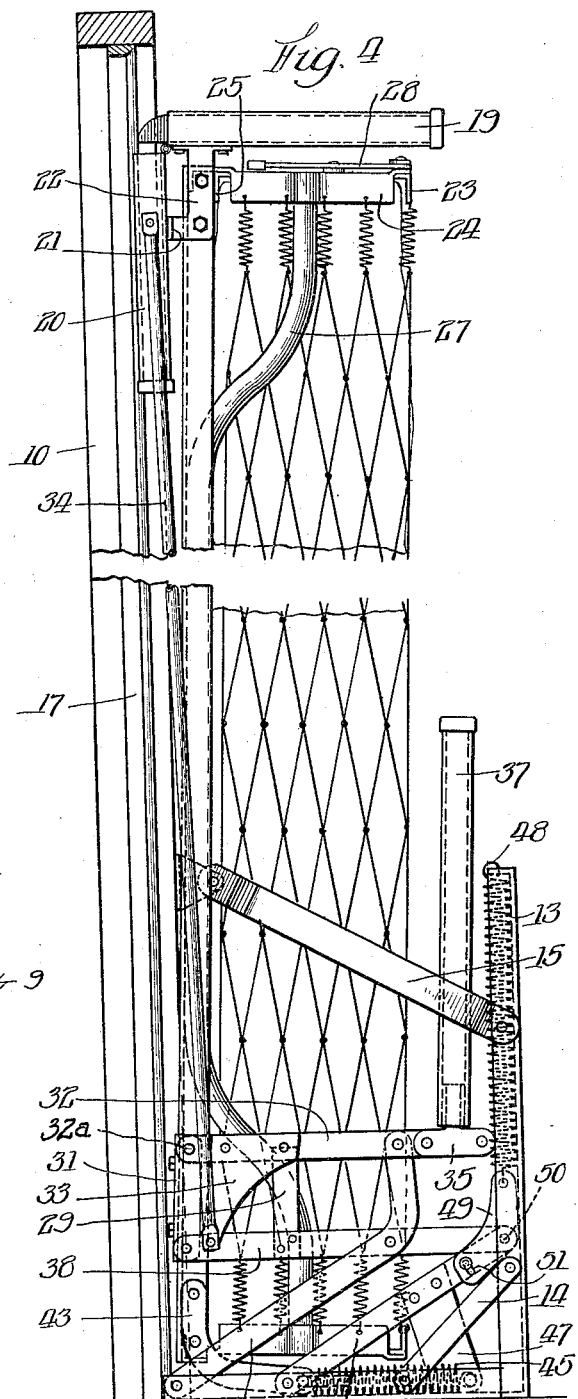
Inventor
Martin Fox,
By Kent W. Nowell  Atty.

Feb. 21, 1933.  M. FOX  1,898,578
RECESS BED
Filed March 22, 1929  2 Sheets-Sheet 2
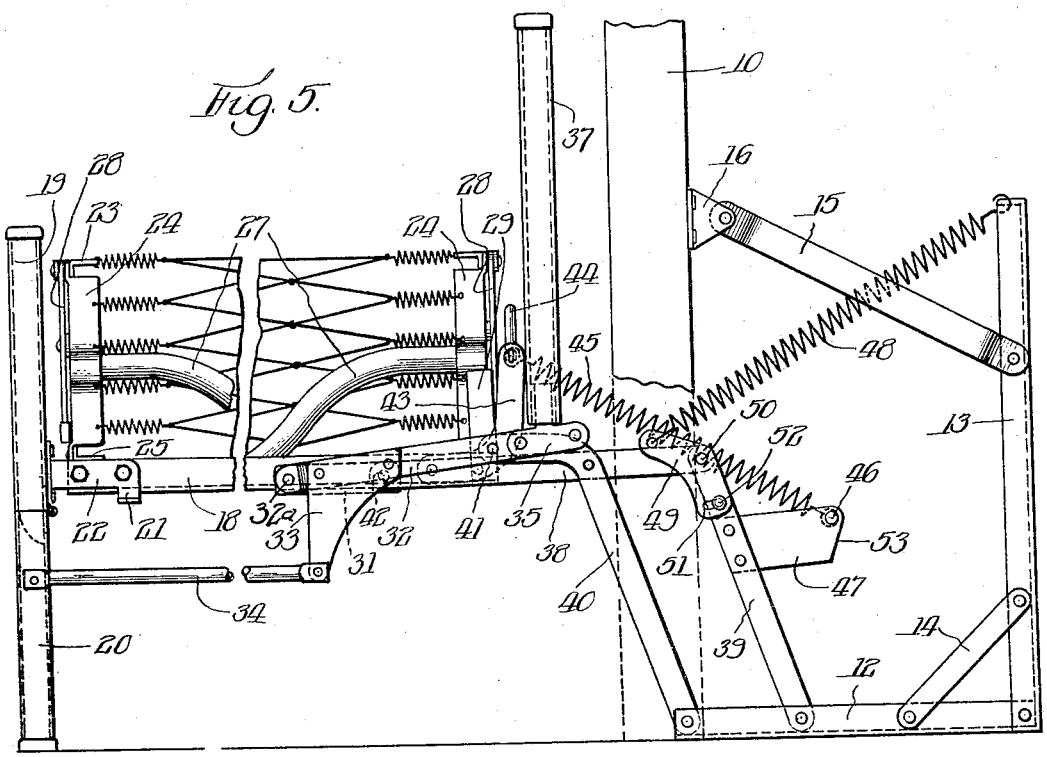
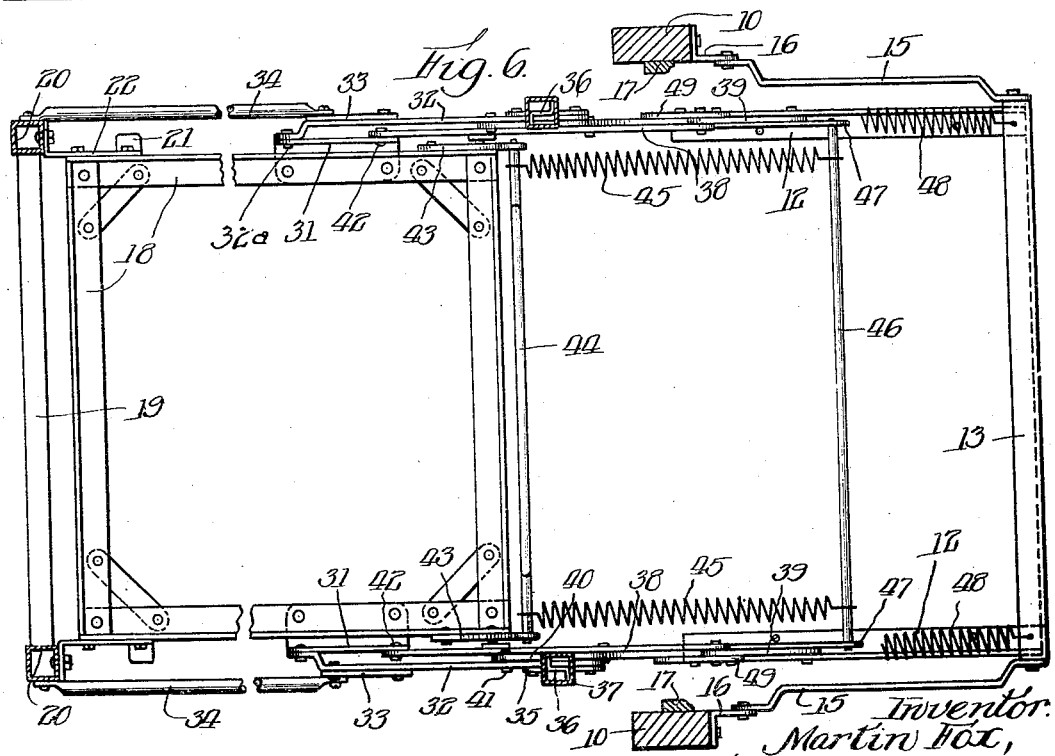
Inventor:
Martin Fox,
By Kent W. Worrell atty.

Patented Feb. 21, 1933

1,898,578

UNITED STATES PATENT OFFICE

MARTIN FOX, OF CHICAGO, ILLINOIS, ASSIGNOR TO THE SENG COMPANY, OF CHICAGO, ILLINOIS

RECESS BED

Application filed March 22, 1929. Serial No. 349,061.

This invention relates in general to an emergency type of up-ending folding bed adapted to be installed in a recess at one side of a room but may have a more general use wherever applicable.

The invention comprises a folding bed of the up-ending type, fixedly mounted in a recess closed by a door or having only a framed opening, the opening being greater in width than the bed in its folded condition.

One of the principal objects of the invention is in the provision of means for mounting a bed of this kind in an opening or a recess in a wall so that the action of pulling down the free end of the bed automatically projects it through the opening a sufficient distance to clear the frame, and to clear a door hinged thereto when it is moved to open position, and to enable the folding sections to be extended laterally without obstruction.

A further object of the invention is in the provision of adequate supporting and reinforcing means for permanently mounting the folding structure upon the floor of the recess.

A still further object of the invention is in the provision of means for inclining the folding bed rearwardly in the recess so that the folding legs at the top of the up-ended bed will not obstruct or prevent the door of the recess from closing.

Other objects will appear hereinafter, the accompanying drawings illustrating a preferred embodiment of the invention.

In the drawings Figs. 1, 2 and 3 are diagrammatic views showing a bed up-ended in a closet, the bed extended through the open door and resting on the floor, and the bed sections laterally unfolded to provide a sleeping surface with a mattress thereon, respectively; Fig. 4 is a side elevation of a bed constructed in accordance with the principles of this invention in up-ended position as shown in Fig. 1; Fig. 5 shows the bed extended through the door opening, as indicated in Fig. 2; and Fig. 6 is a sectional plan of the bed mounting mechanism in the position shown in Fig. 5 but omitting the folding bed sections.

In providing a concealed extra or emergency bed, it is common practice to mount a folding bed structure upon rollers so that it may be moved to and from a closet or into an adjacent room but the present invention relates to a structure which is affixed to the floor of a closet or other recess, braced by the door or recess frame and is of such width that the folding structure may be projected bodily through the frame or door opening without turning a sufficient distance to clear a door hinged at one side of the opening and to allow a full extension laterally of folding bed sections attached to the up-ending frame.

Referring more particularly to the drawings, a folding bed of this kind is shown applied to a recess 8 in a wall 9 of a larger room having a frame 10 in which a door 11 is hinged at one side. This recess 8 may be a closet of an old building or specially built for receiving the up-ending bed and the door is of ordinary width and height so that it is neither conspicuous nor objectionable in size or shape.

Disposed within the recess 8 and secured to the floor at the sides are bars 12 with a rear cross connecting piece 13 extending upward and held in place by braces 14. An additional brace for each side consisting of a link 15 may be attached at one end near the top of each side of the cross piece 13 and connected at its other end by means of a bracket 16 to the inner side of the door frame 10. The front ends of the side bars 12 are located back of the door molding 17 so that they provide no obstruction in closing the door 11.

A bed supporting frame 18 consisting of connected end and side bars is mounted for up-ending movement and carries a fixed foot board 19 at its outer end with hinged legs 20 which are folded under the frame, their folding movement being limited by projections 21 on side plates 22 which connect the foot board 19 to the end of the frame 18. Carried by the frame 18 is a sectional folding bed bottom extensible transversely of the frame and comprising top, side and bottom sections 23, 24 and 25 held together in closed position by a clamp 26 at one side thereof and one of the sections being mounted upon an offset bar 27 secured to the side of the frame 18 so that the sections may be extended in alignment and as they are extended laterally from the frame 18 side supporting legs 28 are automatically extended to hold up that portion of the bed surface which extends beyond the frame 18. A stop 29 is attached to the frame and engages the end of one of the sections 24 for preventing the center of the extended bed from collapsing.

The specific form of the folding bed structure is immaterial, but it is extensible laterally from the supporting frame 18, it folds together in a space not wider than the frame and is, therefore, movable with the frame through the door opening, and if desired the folding sections may be used as a receptacle for containing a mattress 30 and bed clothes.

In mounting the frame 18 to swing through the door frame 10 as it is raised and lowered, an angle plate 31 is attached to the frame at each side near the head end and pivoted thereon by means of a pivot 32a is an offset lever 32 constituting a side member to which a plate 33 is attached providing a projection for pivotally engaging one end of a rod 34, the other end of which is pivotally connected to one of the hinged legs 20 for automatically folding it. Another plate 35 is also attached to this lever 32 with an upward extension 36 for attaching a movable head board 37 at each side of the frame, the head board moving with the frame and maintaining an upright position in both folded and extended positions.

Also pivoted to each of the angle plates 31 is a lever 38 constituting a frame supporting member having parallel members 39 and 40 pivoted thereto at the end and at a distance from the end, the other ends of these members being pivoted to one of the side bars 12. One of the members 40 has an extension which is connected by means of a pivot 41 with the offset lever 32 intermediate the ends thereof.

With this construction the upward movement of the foot end of the frame 18 will swing it upon pivots 42 which connect the levers 38 with the angle plates 31, automatically folding the legs 20 and rocking the levers 38 rearwardly upon the members 39 and 40 in a substantially horizontal position maintaining the head board 37 uprightly and the members 39 and 40 folding downwardly within the supporting frame, as shown in Fig. 4.

In order to cushion and counterbalance the folding movements of the bed the head end of the frame 18 has curved plates 43 attached thereto and projecting beyond the end and connected by a bar 44 to which one end of coil springs 45 are attached, the other ends of the springs being engaged by a cross bar 46 connected between extension plates 47 secured to and extending rearwardly from levers 39. Other springs 48 are each connected at one end to the upper end of frame piece 13, the other end of each spring being connected to one end of a plate 49 mounted on a pivot 50 which connects the members 38 and 39, the other end of each plate having a slot 51 engaged by a projection 52 secured to the member 39 so that the plate 49 is capable of a limited pivotal movement and is drawn to the limits of its movement by the spring 48 as shown in Figs. 4 and 5.

In folding the structure rearwardly in the supporting frame the springs 45 and 48 tend to draw the bed inwardly from the position shown in Fig. 5 to that shown in Fig. 4 and as the bed is folded in the frame the springs 48 cushion the folding movement but are only partially extended so that they also assist in opening or unfolding the bed. The members 38 and 39 assume an acute angled position, as shown in Fig. 4, and the plates 49 have a limited movement about their pivots 50 in order to allow the members 38 and 39 to fold compactly in the supporting frame. Another feature of importance is that the supporting frame 18 and the entire structure attached thereto is folded in the supporting frame at a slight angle from the vertical, as shown more clearly in Fig. 4, for clearance of the legs 20 within the frame 10. This is accomplished by providing the extension plates 47 with an outer contact surface 53 which rest upon the lower web of the supporting side bars 12, thereby holding the members 39 and the attached parts at the desired angle so that the upper end of the frame and bed will be entirely clear of the door 11 when it is swung to closed position against the door molding.

With this construction the bed structure is easily drawn from and returned to the recess opening 8; the frame and bed are counterbalanced by springs so that they move smoothly and easily in both directions; the frame swings the bed structure outwardly into the room where the bed is to be used a sufficient distance to clear the door in its open position; both the front and rear ends of the supporting frame are firmly supported so that there is no tendency for the bed to overturn or become displaced and the bed structure when folded is sufficiently narrow to slide easily into the recess opening without binding or catching; the bed structure comprising the folding sections is extensible laterally after the frame is supported on the floor, and the legs 28 are automatically extended by the unfolding movement; the sleeping surface is prevented from accidentally folding by the stop 29; and the bed structure folds compactly against the floor in its upright position so that it will swing freely and easily through a comparatively low door frame, thereby requiring no conspicuously high opening and being easily applicable to an ordinary door frame and recess.

I claim:

1. An up-ending bed having a sectional bed supporting frame foldable thereon, a recess mounting for pivoting the frame for up-ending movement, a swinging connection between the mounting and the frame including a pair of pivoted levers and a member by which they are connected to the frame, one of the levers having a supporting plate for engaging the recess mounting and holding the levers in an inclined position in the mounting and supporting the up-ended frame in an inclined position above the mounting.

2. In an up-ending bed, a sectional bed supporting frame, a pivoted frame supporting member at each side thereof, a pair of mounting levers pivoted to each of the members, a separate side member pivoted at one end to the frame and intermediate its ends to the end of one of the levers, a head board mounted at the other end of the side members, a foot board secured to the opposite end of the frame and having hinged legs, means for connecting the legs to the side member whereby the upward movement of the bed frame about its pivot will fold the legs and will swing the head board in upright position to clear the bed frame and lodge them together in a compact upright relation.

3. In an up-ending bed, a frame pivoted for up-ending movement, means for mounting the frame to swing about one end as it is pivotally moved from a position above the floor to a position in close contact with the floor in its up-ended position, a foot board with hinged legs secured to the outer end of the frame, a head board carried by the mounting means, and supporting means in connection with the mounting means for holding the up-ended bed frame and the head board in parallel compact relation inclined from the vertical so that the folded legs will come within the confines of the vertical space defined by the base of the frame.

4. In an up-ending bed, a pivoted bed supporting frame, a recess mounting therefor comprising side bars and an upright cross connector, mounting means comprising parallel levers pivoted in the side bars and connected to the frame, and means for counterbalancing the bed frame in both positions of rest, said means comprising a plate pivoted on one of the levers, and a spring connected thereto and to the cross support and having a pin and slot connection with the lever for limiting the movement of the plate, the pin and slot connection allowing the plate to fit closely against the cross connector in the folded position of the bed.

5. A folding bed comprising a frame, a plurality of bed sections supported by the frame and hinged together for a successive folding and unfolding movement at one side of the frame and means projecting from the frame into the path of one of the bed sections when it is unfolded to prevent the bed sections from collapsing with respect to the frame.

MARTIN FOX.